United States Patent [19]
Vasan

[11] Patent Number: 4,719,019
[45] Date of Patent: Jan. 12, 1988

[54] TREATMENT OF THIOCYANATE CONTAINING WASTE LIQUOR

[76] Inventor: Srini Vasan, 170 Weeburn Dr., New Canaan, Conn. 06840

[21] Appl. No.: 939,952

[22] Filed: Dec. 10, 1986

[51] Int. Cl.⁴ ............................................. B01D 17/00
[52] U.S. Cl. ..................... 210/752; 210/758; 210/904
[58] Field of Search .............. 210/750, 749, 758, 752, 210/904, 757, 749; 423/236, 365, 366, 511, 562

[56] References Cited

U.S. PATENT DOCUMENTS

| | | | |
|---|---|---|---|
| 4,211,646 | 7/1980 | Westbrook et al. | 210/904 |
| 4,393,166 | 7/1983 | Reischl et al. | 210/757 |
| 4,410,432 | 10/1983 | Domahidy | 210/750 |
| 4,454,259 | 6/1984 | Reischl et al. | 210/757 |

*Primary Examiner*—Frank Sever
*Attorney, Agent, or Firm*—St. Onge Steward Johnston & Reens

[57] ABSTRACT

A process is described for the treatment of waste liquor containing a mixture of alkali metal or ammonium thiocyanate and polysulfides to convert the latter to the corresponding sulfates. The waste liquor is admixed with concentrated sulfuric acid under turbulent mixing conditions and in an inert atmosphere. The treated liquor is purged of gaseous by-products using an inert gas (e.g. carbon dioxide) and the purged liquor is treated to recover sulfate therefrom.

15 Claims, 1 Drawing Figure

0
TREATMENT OF THIOCYANATE CONTAINING WASTE LIQUOR

BACKGROUND OF THE INVENTION

1. Field of the Invention

This invention relates to the treatment of waste liquor from industrial processes and is more particularly concerned with the treatment of waste liquor containing a mixture of polysulfide and thiocyanate to recover sulfates therefrom.

2. Description of the Prior Art

Coke oven plants, associated with steel mills, generate gases which are rich in hydrogen cyanide, hydrogen sulfide and reduced sulfur compounds together with gaseous products of incomplete combustion such as carbon monoxide, hydrogen, nitrogen, methane, carbon dioxide and the like. The coke oven gases therefore have to be treated for removal of hydrogen sulfide and reduced sulfur compounds before these gases can be utilized for their fuel value in furnaces, otherwise the sulfur compounds would be converted to sulfur dioxide and discharged in the flue gas from the furnaces.

Currently the standard technique for treating coke oven gases has been the so-called Stretford process which employs a vanadate compound and a quinone to convert the hydrogen sulfide and reduced sulfur compounds in the gas to elemental sulfur on a substantially quantitative basis. Unfortunately, the hydrogen cyanide present in the gas is totally converted to thiocyanate, in the presence of elemental sulfur, if treated in the Stretford process. The thiocyanate is difficult to separate from the costly vandates and quinones; also it greatly complicates the recovery and re-use of the latter. Accordingly, the coke oven gas must be selectively treated to remove at least the major amount of the hydrogen cyanide before the gas can be subjected to the Stretford process. The hydrogen cyanide is generally separated in this manner by contacting the gas with a wash system containing sodium or ammonium polysulfide. The latter scrubs the hydrogen cyanide from the gas by reacting with it to form the corresponding sodium or ammonium thiocyanate. The hydrogen cyanide level in the treated gas is reduced to a sufficiently low level (ca 150 ppm from an initial level of 5000 ppm) to avoid any problems when the gas is subsequently subjected to the Stretford process; see Moyes and Vasan, Oil and Gas Journal Sept. 2, 1974. "Holmes-Stretford H2S Removal process proved in use."

The waste liquor containing a mixture of sodium or ammonium polysulfides and thiocyanate which results from the hydrogen cyanide scrubbing process, is currently processed by evaporation followed by oxidation at high pressures and temperatures in an autoclave to convert the polysulfides and thiocyanates to the corresponding sulfates. However, this method involves high capital investment and operating costs and also encounters serious problems of equipment corrosion. It has now been found that the waste liquor from the above hydrogen cyanide scrubbing process can be processed very satisfactorily and at greatly reduced cost to yield commercially marketable grades of sodium or ammonium sulfate as well as yield useful combustible gaseous by-products.

SUMMARY OF THE INVENTION

It is an object of the invention to provide an improved process for the treatment of waste liquor containing thiocyanate and polysulfides. It is a further object of the invention to provide a process for converting waste liquor containing alkali metal or ammonium thiocyanates and polysulfides to the corresponding sulfates.

It is yet another object of the invention to convert alkali metal or ammonium thiocyanates and polysulfides, present in admixture in an industrial waste liquor, to commercially marketable alkali metal or ammonium sulfate and useful, combustible gaseous by-products.

These objects, and other objects which will become apparent from the description which follows, are achieved by the process of the invention. The latter, in its broadest aspect, comprises an improved process for the treatment of waste liquor containing a mixture comprising alkali metal or ammonium thiocyanates and polysulfides to convert said thiocyanates and polysulfides to the corresponding sulfate wherein the improvement comprises intimately admixing said liquor in an inert atmosphere with at least a stoichiometric amount of concentrated sulfuric acid.

The liquor, after admixture with the sulfuric acid, is purged using an inert gas to recover gaseous by-products which can be utilized for their fuel value in furnaces. The purged liquor is ultimately treated to recover alkali metal or ammonium sulfate therefrom in sufficient purity to be marketable commercially.

The process of the invention can be operated as a batch process or in a continuous manner.

DETAILED DESCRIPTION OF THE INVENTION

Figure 1:
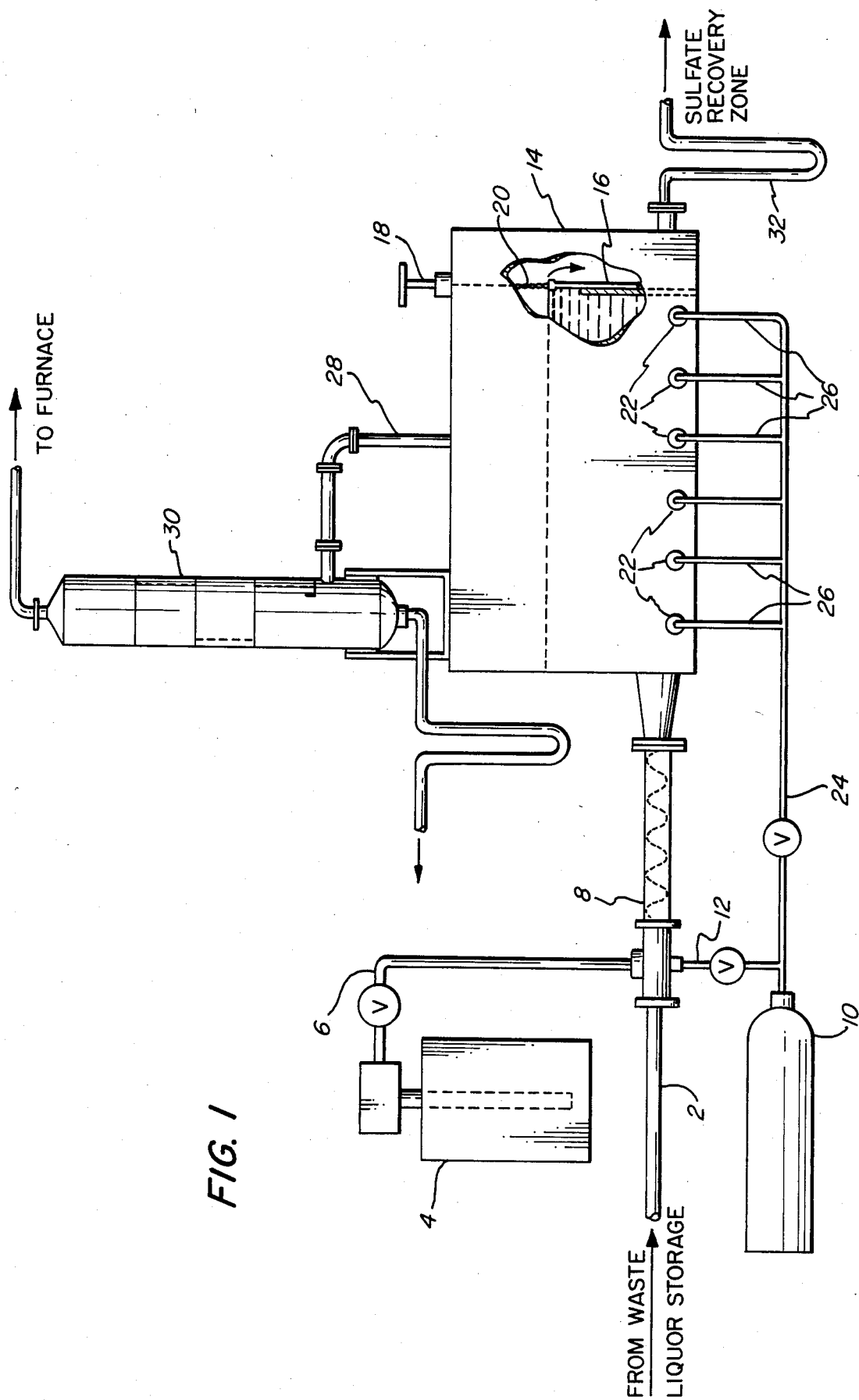
FIG. 1 is a schematic diagram illustrating one embodiment of a process according to the invention.

The process of the invention, whether employed in a batch operation or in a continuous manner, involves the following steps. In the initial phase of the process the waste liquor to be treated and concentrated sulfuric acid are brought together in such a manner that the two components become completely and thoroughly admixed as quickly as possible using appropriate mixing devices conventionally employed in the art. Typical of such devices are those generally referred to in the art as turbulent mixer of which that which is available under the name "KENICS" is a particularly suitable example of a static mixer of this type. The admixture of the waste liquor and acid generates significant quantities of heat due to interaction of the acid with water and to the reaction which results in total destruction of the thiocyanate. If the mixing of acid and waste liquor is not carried out expeditiously and completely as described above, localized overheating will take place within the reaction mixture. This can result in deposition of sulfur from the mixture due to partial conversion of the thiocyanate with deleterious effects on the overall efficiency of the waste liquor treatment process.

Further the admixture of waste liquor and acid is carried out under an inert atmosphere in order to avoid oxidation of hydrogen sulfide in the waste liquor to colloidal sulfur. Deposition of the latter greatly interferes with, and in some cases prevents, successful operation of the recovery process of the invention. Any of the inert gases currently employed to carry out chemical reactions in an oxygen-free atmosphere can be used. Illustrative of such gases are nitrogen, carbon dixoide, argon and the like. Carbon dioxide is particularly advantageous for use in the process of the invention. Alternatively, cleaned coke oven gas i.e., effluent from the Stretford unit can also be used for this purpose.

The relative proportions of acid and waste liquor employed in any given instance in this initial step of the process of the invention will vary depending largely upon the composition of the particular composition of the waste liquor being treated. Generally speaking, the amount of acid employed will be substantially in excess of stoichiometric with respect to the polysulfide and thiocyanate present in the reaction mixture. That is to say, there will be at least 5 moles of sulfuric acid for each mole of polysulfide and at least 5 moles of sulfuric acid for each mole of thiocyanate. Amounts of acid greatly in excess of these amounts are undesirable both in terms of economics and of achieving the desired result. The optimum amount of acid to be employed in any given instance can be determined readily by a process of trial and error employing an aliquot of the liquor to be treated.

If desired, or necessary, the temperature of the reaction mixture during this intitial step of the process of the invention can be controlled by application of appropriate cooling means during or after the mixing of the two components. In general, the reaction temperature is advantageously within the range of about 20° C. to about 50° C. and preferably within the range of about 30° C. to about 40° C. Preferably the reaction temperature should not exceed about 40° C.

After the mixing step has been completed, the reaction mixture is subjected, in the second step, to purging, using an inert gas which can be, and preferably is, the same as that used in the mixing step. Advantageously, the purging is accomplished by bubbling the inert gas, preferably using two or more streams of gas, through the reaction mixture. The bubbling of a plurality of streams of inert gas, advantageously from inlets located at or near the bottom of the vessel in which the treated waste is contained will generally serve to provide adquate agitation of the liquor. Additional agitation by mechanical means may be provided if desired. The liquor is preferably at a temperature within the range attained in the first step of the process but the passage of inert gas will effect cooling of the liquor over time. Optionally, the liquor can be heated to maintain its temperature within the range set forth above during the purging in the above manner.

The purging serves to scrub gaseous by-products from the treated waste liquor and these by-products become entrained in the inert gas and can be carried off overhead and fed as part of the fuel gas to a furnace.

In the final step of the process of the invention, the liquor remaining after the purging step is complete is treated to recover the alkali metal or ammonium sulfate which has been generated by reaction of the sulfuric acid with the waste liquor in the first step of the reaction. This can be achieved by any conventional method such as concentration of the liquor followed by crystallization of the sulfate from the concentrate. Alternately the purged liquor is evaporated to dryness and the residue is recrystallized from water. The sulfate thus obtained is found to possess sufficient purity to be marketed as commercial grade material without requiring any further purification.

Referring now to FIG. 1, there is shown a flow diagram illustrating a continuous process in accordance with the invention. Waste liquor is fed continuously through pipe 2, and concentrated sulfuric acid is fed continuously from storage tank 4 via pipe 6 to turbulent mixer 8. The rate of flow of the two streams is adjusted to yield the appropriate proportion of mixing of the two components as determined in the manner described above. Inert gas is also fed from storage tank 10 via pipe 12 to the entrance to the mixer 8 at a rate sufficient to exclude atmospheric oxygen from entering the mixer. The mixer 8 may be provided with cooling means (not shown) to control the temperature of the mixed components to within the appropriate range discussed previously. The reaction mixture is continuously fed into holding tank 14 which is provided with adjustable baffle 16 which can be raised or lowered by operation of winch 18 and chain 20 to maintain the desired level of fluid in the tank thereby adjusting the hold up time of fluid in the tank to the desired level. Tank 14 is also provided with a plurality of inlets 22 through which streams of inert gas are introduced by feeding the gas at the appropriate rate from gas storage tank 10 via pipe 24 and individual feeder pipes 26. Efficient countercurrent scrubbing with inert gas is thereby achieved using this arrangement. Gas is vented continuously from tank 18 via overhead duct 28 and conducted via mist scrubbing tower 30 to a furnace as part of the fuel gas feed thereto. Purged liquor continuously spills over baffle 16 and is drained from the tank via pipe 32 to the zone in which the sulfate (either alkali metal or ammonium) is recovered therefrom by concentration and crystallization.

The process of the invention has been described hereinabove in terms of various embodiments which have been given for purposes of illustration only and are not intended to be construed as limiting as to the scope of the invention. Various modifications of the embodiments which can be made without departing from the scope of the invention will be readily apparent to one skilled in the art.

What is claimed is:

1. In a process which includes, treating waste liquor containing a mixture comprising alkali metal or ammonium thiocyanates and polysulfides the improvement which comprises intimately admixing said liquor, in an inert atmosphere, with concentrated sulfuric acid in an amount sufficient to convert said thiocyanates and polysulfides to the corresponding sulfate.

2. A process according to claim 1 wherein the admixture of liquor and concentrated sulfuric acid is carried out under turbulent mixing conditions.

3. A process according to claim 1 wherein said inert atmosphere comprises carbon dioxide.

4. A process according to claim 1 wherein said inert atmosphere comprises cleaned coke oven gas.

5. A process according to calim 1 wherein, after said admixing is complete, the treated liquor is purged countercurrently with an inert gas to remove gaseous by-products.

6. A process according to claim 5 wherein the purged liquor is treated to recover the alkali metal or ammonium sulfate therefrom.

7. A process according to claim 1 wherein the amount of concentrated sulfuric acid employed is such as to provide at least 5 moles per mole of thiocyanate and at least 5 moles per mole of polysulfide.

8. In a process which includes, treating waste liquor containing a mixture comprising alkali metal or ammonium thiocyanates and polysulfides the steps comprising:

admixing said liquor with concentrated sulfuric acid in a turbulent mixing zone under an inert atmosphers;

transferring the admixture to a second zone in which said liquor is purged with a plurality of streams of inert gas;

recovering combustible gases overhead from said second zone; and transferring said purged liquor to a third zone for recovery of alkali metal or ammonium sulfate therefrom.

9. A process according to claim 8 wherein said inert atmosphere and said inert gas both comprise carbon dioxide.

10. A process according to claim 8 wherein said inert atmosphere and or said inert gas comprise cleaned coke oven gas.

11. A process according to claim 8 wherein the sulfuric acid is employed in at least five times the stoichiometric amount with respect to the mixture of thiocyanates and polysulfides in the liquor being treated.

12. A process according to claim 8 wherein said sulfate is recovered by crystallization in said third zone.

13. A process according to claim 8 wherein said waste liquor contains a mixture of ammonium thiocyanate and ammonium polysulfide.

14. A process according to claim 8 wherein said waste liquor contains a mixture of sodium thiocyanate and sodium polysulfide.

15. In a continuous process which includes, treating waste liquor containing a mixture comprising alkali metal or ammonium thiocyanates and polysulfides the steps comprising:

continuously feeding separate streams of waste liquor and concentrated sulfuric acid to a mixing zone and subjecting said streams to mixing therein under turbulent conditions in an inert atmospher;

continuously passing said mixed streams from said mixing zone through a stripping zone in which said mixed liquid streams are stripped of gaseous by-products by purging with a plurality of streams of an inert gas;

continuously removing overhead a stream of inert gas having said gaseous by-products entrained therein; and continuously passing said liquid streams from said stripping zone to a sulfate recovery zone.

* * * * *